(12) United States Patent
Pabst et al.

(10) Patent No.: US 10,535,993 B2
(45) Date of Patent: Jan. 14, 2020

(54) CONTROL SYSTEM COUNTERMEASURES

(71) Applicant: S&C Electric Company, Chicago, IL (US)

(72) Inventors: Paul Michael Pabst, Glen Ellyn, IL (US); Michael James Higginson, Mount Prospect, IL (US); Keith Moses, Chicago, IL (US)

(73) Assignee: S&C Electric Company, Chicago, IL (US)

( * ) Notice: Subject to any disclaimer, the term of this patent is extended or adjusted under 35 U.S.C. 154(b) by 0 days.

(21) Appl. No.: 16/170,280

(22) Filed: Oct. 25, 2018

(65) Prior Publication Data

US 2019/0237965 A1     Aug. 1, 2019

Related U.S. Application Data

(60) Provisional application No. 62/623,508, filed on Jan. 29, 2018.

(51) Int. Cl.
*H02H 7/28* (2006.01)
*H02H 1/00* (2006.01)

(52) U.S. Cl.
CPC ............ *H02H 7/28* (2013.01); *H02H 1/0092* (2013.01)

(58) Field of Classification Search
CPC ........... H02H 7/28; H02H 1/0092; H02H 1/00
See application file for complete search history.

(56) References Cited

U.S. PATENT DOCUMENTS 9,720,395 B2 *   8/2017   Shi ....................... G05B 19/042

\* cited by examiner

*Primary Examiner* — Carlos Amaya

(57) ABSTRACT

A method for correcting protection settings in a relay provided in a micro-grid between a grid-connected settings group when the micro-grid is electrically coupled to a utility grid and an islanded settings group when the micro-grid is disconnected from the utility grid. The method determines whether the micro-grid is connected to the utility grid and what settings group the relay is in. The method changes the settings group of the relay to the grid-connected settings group if a time that the micro-grid is connected to the utility grid and the relay is in the islanded settings group exceeds a predetermined time and changes the settings group of the relay to the islanded settings group if the time that the micro-grid is not connected to the utility grid and the relay is in the grid-connected settings group exceeds the predetermined time.

20 Claims, 3 Drawing Sheets

CONTROL SYSTEM COUNTERMEASURES

BACKGROUND

Field

This disclosure relates generally to a method for correcting a protection settings group in a relay that controls a circuit breaker provided in a micro-grid and, more particularly, to a method for correcting a protection settings group in a relay that controls a circuit breaker provided in a micro-grid between a grid-connected settings group suitable for higher fault currents and a more stable frequency and voltage when the micro-grid is electrically coupled to a utility grid and an islanded settings group suitable for lower fault currents and a less stable frequency and voltage when the micro-grid is disconnected from the utility grid, where the method sets a timer if there is a mismatch between what settings group the relay is in and what settings group the relay should be in, and changes the settings group to what settings group the relay should be in when the timer expires.

Discussion

An electrical power distribution utility, referred to herein as a utility grid, provides three-phase electrical power on a power distribution network to deliver the power at the proper voltage for a number of loads, such as homes, businesses, manufacturing facilities, etc. The utility grid includes various power sources, substations, switching devices, feeder lines, lateral lines, circuit breakers, transformers, current and voltage detectors, etc. that operate to deliver the three-phase power to the loads in a controlled and stable manner.

Faults may periodically occur in the utility grid that create short circuits or near short circuits that may significantly increase the current flow to the fault location from the power source, and may cause electrical voltage disturbances throughout the utility grid, where the voltage sags and decreases at a certain rate and to a certain level depending on the relative location of the fault and the load. Techniques are known in the art that detect the occurrence of such faults typically by detecting a high fault current, and open circuit breakers, reclosers, etc. at the appropriate location to remove or clear the fault from the utility grid as quickly as possible so as to prevent damage to circuits and components.

Some utility grids may include one or more micro-grids, where each micro-grid includes one or more power sources, such as photovoltaic cells, generators, battery modules, wind farms, etc., where the power sources may be distributed throughout the micro-grid. The power sources in the micro-grid may be generating power during normal operation when the micro-grid is connected to the utility grid, where the micro-grid power sources may be reducing the amount of power that the loads in the micro-grid are drawing from the utility grid, or may be placing power onto the utility grid.

When a fault occurs in the utility grid outside of the micro-grid when the micro-grid is connected to the utility grid, referred to herein as being grid-connected, it is desirable to open a disconnect switch and disconnect the micro-grid from the utility grid, referred to herein as the micro-grid being islanded, i.e., self-reliant, and then use the power sources in the micro-grid to power the loads therein. Typically, when the disconnect switch is opened, the various breakers in the micro-grid are also opened prior to the micro-grid power sources being switched on, and once the power sources are providing electrical energy, then the breakers are closed in a certain sequence to add load to the sources.

The magnitude of a fault current detected in the micro-grid can be significantly different between when the micro-grid is grid-connected where the utility power levels are higher and when the micro-grid is islanded where the power levels are typically lower. Because of this, sometimes normal current levels in the micro-grid when the micro-grid is grid-connected may be close to fault currents in the micro-grid when the micro-grid is islanded. More specifically, if a number of loads are connected to the utility grid during normal operation, where hundreds of amps could be drawn by the loads, such a normal, but high current may be considered a fault current if the micro-grid is islanded. For example, the power sources in the utility grid may generate a fault current that exceeds 2500 amps, but a power source in the micro-grid may generate a fault current of only 600 amps, where 600 amps is about six times the normal current output of a micro-grid generator. Further, because the power sources in the micro-grid may be distributed, where multiple generators may be providing power to the micro-grid at one point in time, and a single generator may be providing power to the micro-grid at another point in time, it becomes even more difficult to distinguish between normal load current when multiple generators are operating, and a fault current when a single generator is operating. Therefore, if the fault current detectors in the micro-grid are set for detecting a fault current well above the normal current levels of the utility grid, they may not detect a lower fault current when the micro-grid is islanded. Likewise, if the fault current detectors in the micro-grid are set for detecting a fault current typical of fault currents when the micro-grid is islanded, they may detect a fault current that is a normal current when the micro-grid is grid-connected.

The power system characteristics of a grid-connected micro-grid and an islanded micro-grid are also different in other ways. For example, the electrical utility provides the voltage and frequency reference to a power system that is grid-connected. In general, voltage will not deviate from nominal by more than 5% and the frequency will not deviate from nominal by more than 1%) during normal operation. An islanded micro-grid that is powered by local power sources could have voltage deviations of more than 5% and frequency deviations of more than 1% during normal operation. Further, the frequency and voltage in a micro-grid may significantly vary during power system events such as faults, load swings and loss of power generation.

For at least the reasons discussed above, it is known in the art to employ different protection settings groups for relays in the micro-grid for when the micro-grid is grid-connected and when the micro-grid is islanded, referred to herein as a grid-connected settings group for detecting higher fault currents and allowing less frequency and voltage deviations when the micro-grid is connected to the utility grid and an islanded settings group for detecting lower fault currents and allowing greater frequency and voltage deviations when the micro-grid is islanded. When the micro-grid transitions from being grid-connected to islanded, the settings groups in the relays are also transitioned from the grid-connected settings group to the islanded settings group. Likewise, when the micro-grid transitions from being islanded to grid-connected, the settings groups in the relays are also transitioned from the islanded settings group to the grid-connected settings group. However, switching the settings groups when the micro-grid is disconnected and connected to the utility grid often requires several seconds where the relay is in an intermediate state, and may not be able to adequately protect the micro-grid components during that time.

SUMMARY

The present disclosure describes a system and method for correcting protection settings groups in a relay that controls a circuit breaker provided in a micro-grid between a grid-connected settings group suitable for higher fault currents and a more stable frequency and voltage when the micro-grid is electrically coupled to a utility grid and an islanded settings group suitable for lower fault currents and a less stable frequency and voltage when the micro-grid is disconnected from the utility grid. The method determines whether the micro-grid is connected to the utility grid and whether the relay is in the grid-connected settings group or the islanded settings group. The method changes the settings group of the relay to the grid-connected settings group if a time that the micro-grid is connected to the utility grid and the relay is in the islanded settings group exceeds a predetermined time and changes the settings group of the relay to the islanded settings group if the time that the micro-grid is not connected to the utility grid and the relay is in the grid-connected settings group exceeds the predetermined time.

Additional features of the present disclosure will become apparent from the following description and appended claims, taken in conjunction with the accompanying drawings.

DETAILED DESCRIPTION OF THE EMBODIMENTS

The following discussion of the embodiments of the disclosure directed to a system and method for correcting protection settings groups in a relay that controls a circuit breaker provided in a micro-grid between a grid-connected settings group suitable for higher fault currents and a more stable frequency and voltage when the micro-grid is electrically coupled to a utility grid and an islanded settings group suitable for lower fault currents and a less stable frequency and voltage when the micro-grid is disconnected from the utility grid is merely exemplary in nature, and is in no way intended to limit the disclosure or its applications or uses.

Figure 1:
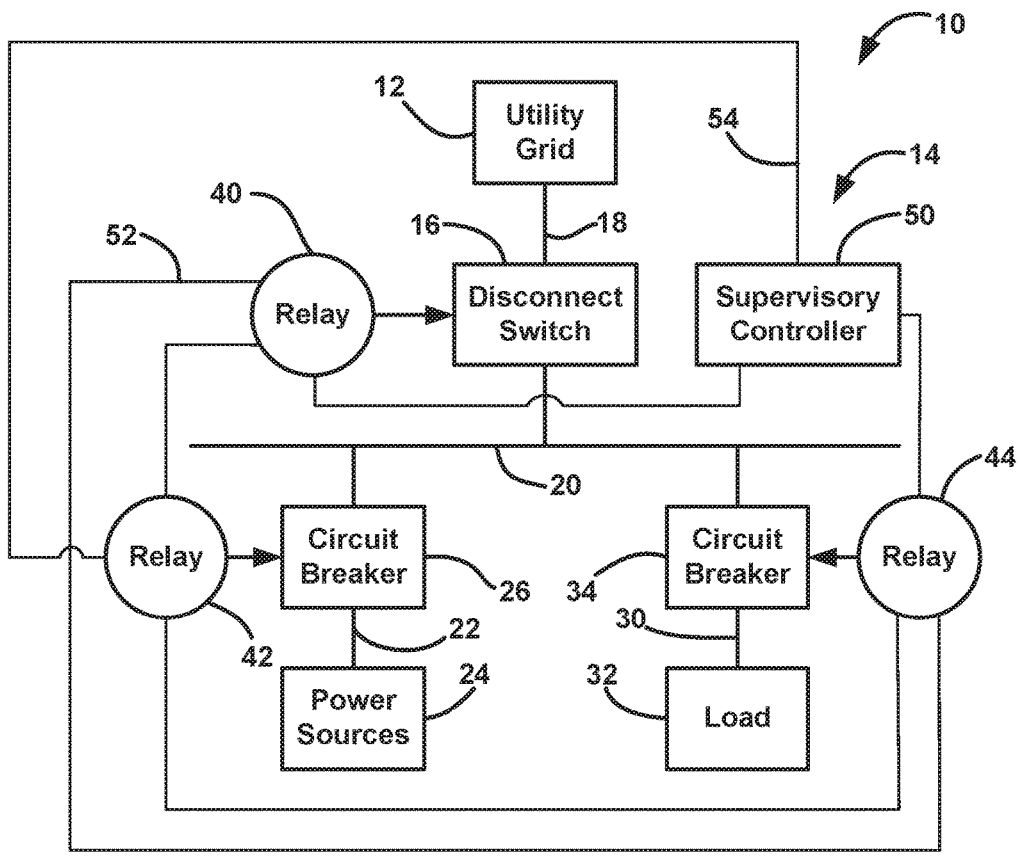
FIG. 1 is a block diagram of an electrical power distribution network including a utility grid and a micro-grid.

FIG. 1 is a block diagram of an electrical power distribution network 10 including a utility grid 12 and a micro-grid 14 electrically coupled together by an electrical line 18 and a micro-grid disconnect switch 16 operating as a point of common coupling (PCC) therebetween. The network 10 is intended to represent any electrical power distribution system or network of any size and configuration that provides electrical power from any number or type of power plants (not shown) over any suitable distance on any type of transmission line (not shown) to electrical substations (not shown) to be distributed on feeder lines (not shown) to any suitable load.

A feeder bus 20 is connected to the electrical line 18 on the micro-grid side of the switch 16 in the micro-grid 14. An electrical line 30 is coupled to the feeder bus 20 and provides power to a number of loads 32 through one or more circuit breakers 34 from the utility grid 12 when the switch 16 is closed, where any suitable number of electrical lines servicing any suitable number of loads can be provided in the micro-grid 14. An electrical line 22 is also coupled to the feeder bus 20 and is electrically coupled to one or more distributed power sources 24 through a circuit breaker 26, where multiple electrical lines including multiple power sources and circuit breakers may be provided within the micro-grid 14. When the switch 16 is opened and the micro-grid 14 is disconnected from the utility grid 12, the power sources 24 provide power for the loads 32.

The switch 16 is controlled by a relay 40, the circuit breaker 26 is controlled by a relay 42 and the circuit breaker 34 is controlled by a relay 44, where the relays 40, 42 and 44 include sensors for measuring current and voltage on the lines 18, 22 and 30, respectively, microprocessors that process the current measurement signals so as to open the switch 16 and/or the circuit breakers 26 and 34 in response to a detected fault current, and communications capabilities for communicating with other devices and components in the network 10 consistent with the discussion herein. Suitable timing features are employed in the relays 40, 42 and 44, such as time current characteristic (TCC) curves, that identify how fast the relay will open the particular switch or circuit breaker in response to the detection of a fault current. For example, if the switch 16 is closed and the micro-grid 14 is electrically coupled to the utility grid 12, and a fault occurs in the line 30, then it is desirable that the circuit breaker 34 be opened before the switch 16 so that the fault is cleared without affecting those loads that are not on the fault current path in the micro-grid 14. If the fault occurs in the utility grid 12 upstream of the switch 16, then it is desirable that the switch 16 open in response to the fault current. This timing is possible by knowing the direction of the current flow through the switch 16, and thus whether the fault is upstream of the switch 16 in the utility grid 12 or downstream of the switch 16 in the micro-grid 14.

The network 10 also includes a supervisory controller 50 that controls the relays 40, 42 and 44 and receives data therefrom on relatively low speed control lines, such as supervisory control and data acquisition (SCADA) lines 52. Further, the relays 40, 42 and 44 are in communication with each other over high speed control lines 54, such as IEC-61850 GOOSE messaging over fiber optic lines, so that each of the relays 40, 42 and 44 knows the status of all of the other relays 40, 42 and 44, and thus whether the switch 16 and the circuit breakers 26 and 34 are open or closed.

As mentioned above, switching between the grid-connected settings group when the micro-grid 14 is connected to the utility grid 12 and the islanded settings group when the micro-grid 14 is disconnected from the utility grid 12 takes a certain amount of time where the micro-grid 14 is not in any one particular state. In other words, if the relays 42 and 44 are switched between the two settings groups at the same time, there may be several seconds where parts or all of the micro-grid 14 may not protected.

The present disclosure proposes a technique for staggering the time when the relays 42 and 44 are switched between the grid-connected settings group and the islanded settings group when the micro-grid 14 is connected to and disconnected from the utility grid 12 so that the micro-grid 14 is protected from power system events during the transition between grid-connected and islanded. In this technique, if the switch 16 is closed, where the relays 42 and 44 are in the grid-connected settings group, and the relay 40 detects an event in the grid 12, where the switch 16 needs to be opened to disconnect the micro-grid 14 from the utility grid 12, the relay 40 will send a signal to the supervisory controller 50 indicating that it will be opening the switch 16. In response to this signal, the supervisory controller 50 commands the relay 42 to change from the grid-connected settings group to the islanded settings group prior to the switch 16 being opened. The relay 42 tells the controller 50 it has switched settings groups, and then the controller 50 tells the relay 40 it can open the switch 16. The relay 44 detects that the switch 16 has been opened by communications with the relay 40 on one of the lines 52, which causes it to change its settings group to the islanded settings group. When the micro-grid 14 is transitioning from being islanded to grid-connected, the supervisory controller 50 first sends a command to the relay 44 for it to change from the islanded settings group to the grid-connected settings, and then commands the relay 40 to close the switch 16. The relay 42 detects that the switch 16 has been closed by communications with the relay 42 on one of the lines 52, which causes it to change its settings group from the islanded settings group to the grid-connected settings group. Thus, both of the relays 42 and 44 do not change settings groups at the same time.

The micro-grid 14 is protected from power system events during this transition because the relays 42 and 44 are electrically connected in series with the relay 40 so that when the relay 42 is transitioning from the grid-connected settings group to the islanded settings group when the switch 16 is still closed, the relay 44 provides the power system protection, and when the micro-grid 14 is transitioning from islanded to grid-connected when the relay 44 is changing its settings group from islanded to grid-connected and the switch 16 is open, the relay 42 provides the power system protection. It is desirable to change the settings group of the relay 42 before the relay 44 and while the micro-grid 14 is still connected to the utility grid 12 because it is able to protect more of the micro-grid 14 with the islanded settings group during the transition from grid-connected to islanded. Likewise, it is desirable to change the settings group of the relay 44 before the relay 42 when the micro-grid is transitioning from islanded to grid-connected for the same reason.

Figure 2:
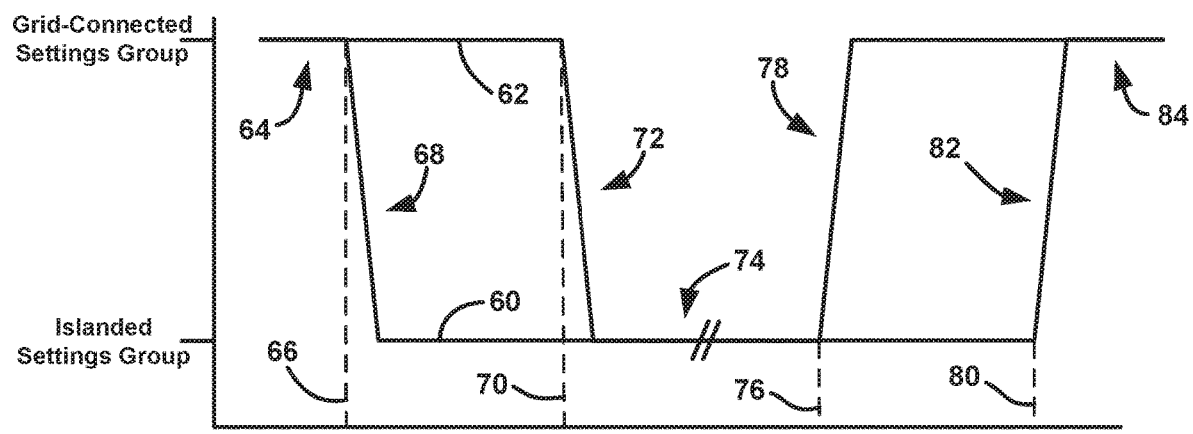
FIG. 2 is a graph with time on the horizontal axis showing a transition of settings group for a relay in the micro-grid between a grid-connected settings group when the micro-grid is connected to the utility grid and an islanded settings group when the micro-grid is disconnected from the utility grid.

The discussion above concerning switching between the islanded and grid-connected settings groups can be shown by the graph in FIG. 2, where time is on the horizontal axis and is not to scale, the grid-connected settings group is shown at one location on the vertical axis and the islanded settings group is shown at a different location on the vertical axis. Line 60 shows the relay 42 transitioning between the islanded and grid-connected settings groups, and line 62 shows the relay 44 transitioning between the islanded and grid-connected settings groups. At location 64, both of the relays 42 and 44 are in the grid-connected settings group, and at time 66 the supervisory controller 50 notifies the relay 42 that the switch 16 will be opening to transition the micro-grid 14 from grid-connected to islanded, where the relay 42 changes from the grid-connected settings group to the islanded settings group at location 68. After the relay 42 has changed to the islanded settings group, the switch 16 is opened. At time 70, the relay 44 detects that the switch 16 has been opened, and changes from the grid-connected settings group to the islanded settings group at location 72, where both of the relays 42 and 44 are in the islanded settings group at location 74. This operation generally takes a few seconds.

At some time during location 76, the supervisory controller 50 notifies the relay 44 that the switch 16 will be closing to transition the micro-grid 14 from islanded to grid-connected, where the relay 44 changes from the islanded settings group to the grid-connected settings group at location 78. After the relay 44 has changed to the grid-connected settings group, the switch 16 is closed. At time 80, the relay 42 detects that the switch 16 has been closed, and changes from the islanded settings group to the grid-connected settings group at location 82, where both of the relays 42 and 44 are in the grid-connected settings group at location 84. This operation also generally takes a few seconds. It is noted that the time it takes the relay 42 or 44 to change between the grid-connected settings group and the islanded settings group is unknown, but can be estimated at a few seconds, and it is that state that the present disclosure is attempting to prevent both of the relays 42 and 44 from being in at the same time.

As discussed above, the supervisory controller 50 instructs the relay 42 or 44 to change its settings group from grid-connected to islanded or vice-versa in anticipation that the disconnect switch 16 will be opened or closed prior to it actually being opened or closed. However, there may be certain occurrences where the controller 50 commands the relay 42 or 44 to change its settings group, but for some reason the switch 16 is not opened or closed thereafter. This type of failure could occur for a number of reasons such as loss of power to the controller 50, loss of communications between the controller 50 and the relays 40 and 42, failure of the switch 16 to open or close when commanded to do so, failure of the supervisory controller 50, etc. Therefore, an undesirable condition may exist where the relay 42 or 44 is in the wrong settings group for the micro-grid 14 being grid-connected or islanded. For example, if the relay 42 is commanded by the controller 50 to change to the islanded settings group in an anticipation of the disconnect switch 16 being opened, and for some reason the switch 16 does not open as anticipated, the relay 42 could be in a configuration where it caused the circuit breaker 26 to open because it thinks a power system event has been detected, but where the conditions are normal for the characteristics of the utility grid 12.

As mentioned above, all of the relays 40, 42 and 44 know the position of the other circuit breaker 26 and 34 and the disconnect switch 16 by being in communication with each other on the lines 52. Therefore, the relays 42 and 44 know whether the disconnect switch 16 is open or closed, and thus whether the micro-grid 14 is grid-connected or islanded. Therefore, the relays 42 and 44 know which settings group it should be in, and which settings group it actually is in. The present disclosure proposes a control scheme where the relay 42 or 44 sets a timer in response to being commanded to change settings group prior to the switch 16 being opened or closed, and if the relay 42 or 44 determines through communication on the lines 52 with the relay 40 that the switch 16 has not actually opened or closed, the relay 42 or 44 will automatically switch back to the other settings group.

Figure 3:
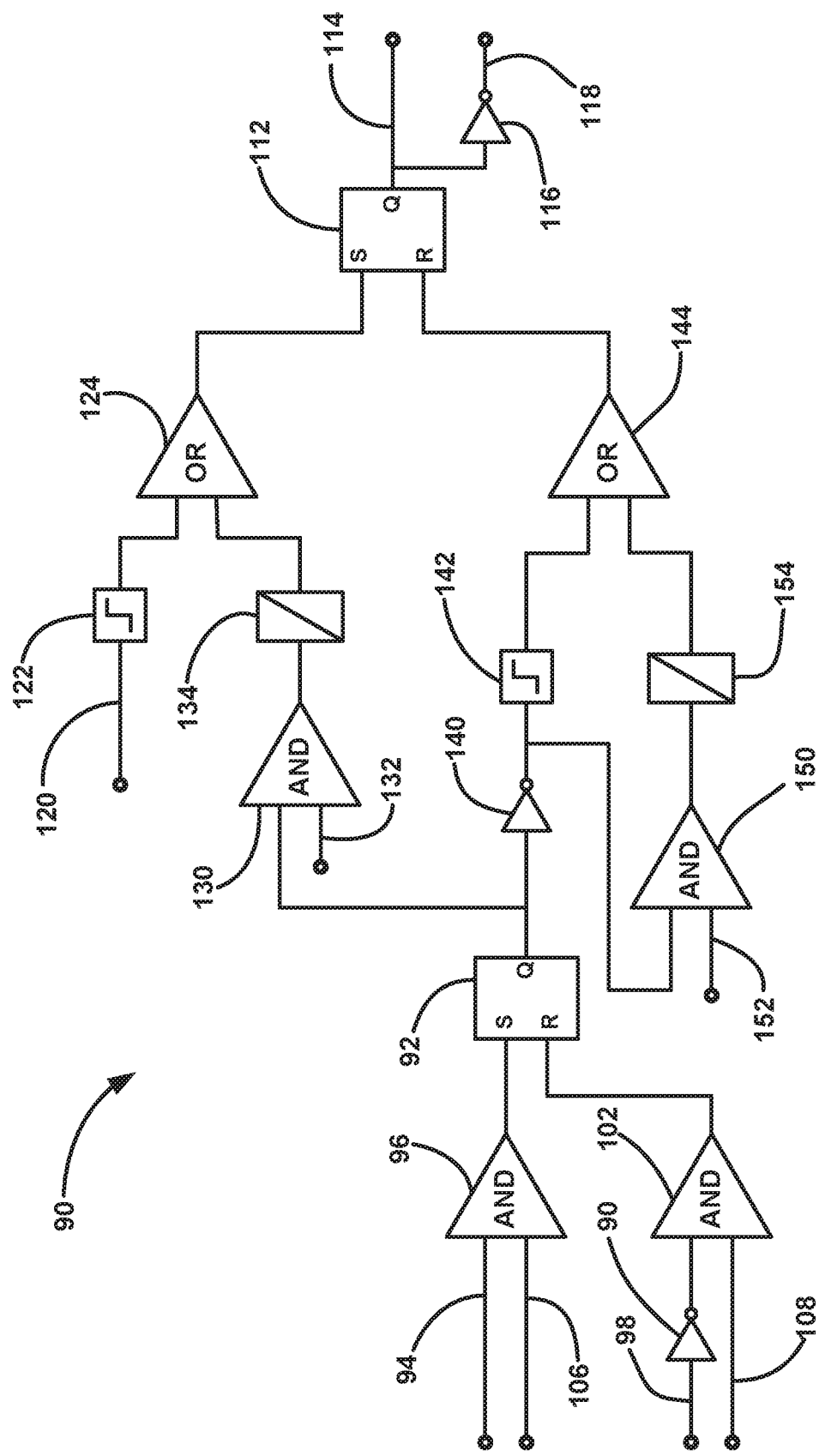
FIG. 3 is a logic diagram showing a process for correcting the settings group of a load circuit breaker relay.

This control operation can be shown by logic diagram 90 in FIG. 3, which is the control logic for the relay 44 that changes its settings group from the grid-connected settings group to the islanded settings group after the relay 42 when the micro-grid 14 is disconnected from the utility grid 12 and changes its settings group from the islanded settings group to the grid-connected settings group before the relay 42 when the micro-grid 14 is connected to the utility grid 12, as discussed above.

The diagram 90 includes an input set-reset (S-R) latch 92 having an output that identifies whether the relay 44 should be in the islanded settings group or the grid-connected settings group, where a logical high or 1 output indicates the grid-connected settings group and a logical low or 0 output indicates the islanded settings group. In order to obtain this output, a grid connection status bit from the relay 40 that indicates whether the switch 16 is open or closed is provided on line 94 to one input of an AND gate 96 and on line 98 through an inverter 100 to one input of an AND gate 102, where a logical high indicates that the switch 16 is closed and the micro-grid 14 is grid connected, and a logical low indicates that the switch 16 is open and the micro-grid 14 is islanded. The input on the lines 94 and 98 can be obtained directly from the relay 40 indicating the status of the switch 16, or can be obtained from any other suitable logic that is able to provide the grid-connected status.

A communications bit is provided on line 106 to the other input of the AND gate 96 and on line 108 to the other input of the AND gate 102 and provides an indication of whether the relay 44 is receiving communications signals from the controller 50 and the other relays 40 and 42, where a logical high indicates that the communications are good and a logical low indicates that the communications have failed. Thus, if the switch 16 is closed and the communications are good, the output of the AND gate 96 is a logical high and the output of the AND gate 102 is a logical low, which sets the latch 92 to a logical high, and if the switch 16 is open and the communications are good, the output of the AND gate 96 is a logical low and the output of the AND gate 102 is a logical high, which sets the latch 92 to a logical low.

The diagram 90 also includes an output S-R latch 112 that provides a logical high when the relay 44 is in or should switch to the grid-connected settings group and provides a logical low when the relay 44 is in or should switch to the islanded settings group. More particularly, if the output of the latch 112 is a logical high, then the relay 44 is set to the grid-connected settings group by a logical high on line 114, and if the output of the latch 112 is a logical low, then the relay 44 is set to the islanded settings group by a logical high on line 118, where the logical low of the latch 112 is inverted by an inverter 116.

The relay 44 may receive a command from the controller 50 on line 120 to change its settings group to the grid-connected settings group, for example, the command discussed above instructing the relay 44 to change its settings group to grid-connected in anticipation that the switch 16 will be closed to connect the micro-grid 14 to the utility grid 12. This logical high is sent to an input of an OR gate 124 through a rising edge detector 122. Since one input of the OR gate 124 is a logical high, the output of the OR gate 124 is a logical high, which sets the latch 112 to a logical high that sets the relay 44 to the grid-connected settings group on the line 114.

If the output of the latch 92 is low indicating that the relay 44 should be in the islanded settings group, that logical low output is inverted by an inverter 140, sent to a rising edge detector 142 and then to one input of an OR gate 144. This would occur, for example, in the situation described above where the relay 42 has transitioned from the grid-connected settings group to the islanded settings group, the switch 16 has been opened, and the relay 44 automatically detects the change in the status of the switch 16 from the relay 40. Since one input of the OR gate 144 is a logical high, the output of the OR gate 144 is a logical high, which resets the latch 112 to a logical low that sets the relay 44 to the islanded settings group on the line 118.

If the relay 44 is set to the islanded settings group by, for example, an incorrect command, but should be in the grid-connected settings group, then the logic diagram 90 makes a correction to change the settings group. Particularly, if the output of the latch 92 is a logical high indicating that the relay 44 should be in the grid-connected settings group, a logical high is sent to one input of an AND gate 130, where the other input to the AND gate 130 on line 132 is a logical high when the relay 44 is in the islanded settings group. If both of these inputs are high, there is a mismatch between what settings group the relay 44 should be in and what settings group the relay 44 is in. This mismatch could be normal when the relay 44 is changing between the settings groups for a short period of time, but would not be normal in some instances for an extended period of time. Therefore, the length of time that the output of the AND gate 130 is a logical high is monitored. Particularly, the output of the AND gate 130 is sent to a timer 134 that is set for a predetermined period of time, for example, five minutes, where if the output of the AND gate 130 remains a logical high for that time, the timer 134 sends a logical high to the other terminal of the OR gate 124, which sets the latch 112 to a logical high that changes the settings group of the relay 44 to the grid-connected settings group where it should be.

If the relay 44 is set to the grid-connected settings group by, for example, an incorrect settings command, but should be in the islanded settings group where the signal from the inverter 140 is a logical low, then the logic diagram 90 makes a correction to change the settings group. Particularly, if the output of the latch 92 is a logical low indicating that the relay 44 should be in the islanded settings group, a logical high is sent to one input of an AND gate 150 from the inverter 140, where the other input to the AND gate 150 on line 152 is a logical high when the relay 44 is in the grid-connected settings group. If both of these inputs are high, there is a mismatch between what the relay 44 should be in and what settings group the relay 44 is in. This mismatch could be normal when the relay 44 is changing between the settings groups for a short period of time, but would not be normal in some instances for an extended period of time. Therefore, the length of time that the output of the AND gate 150 is a logical high is monitored. Particularly, the output of the AND gate 150 is sent to a timer 154 that is set for a predetermined period of time, for example, five minutes, where if the output of the AND gate 150 remains a logical high for that time, the timer 154 sends a logical high to the other terminal of the OR gate 144, which sets the latch 112 to a logical low that changes the settings group of the relay 44 to the islanded settings group where it should be.

Figure 4:
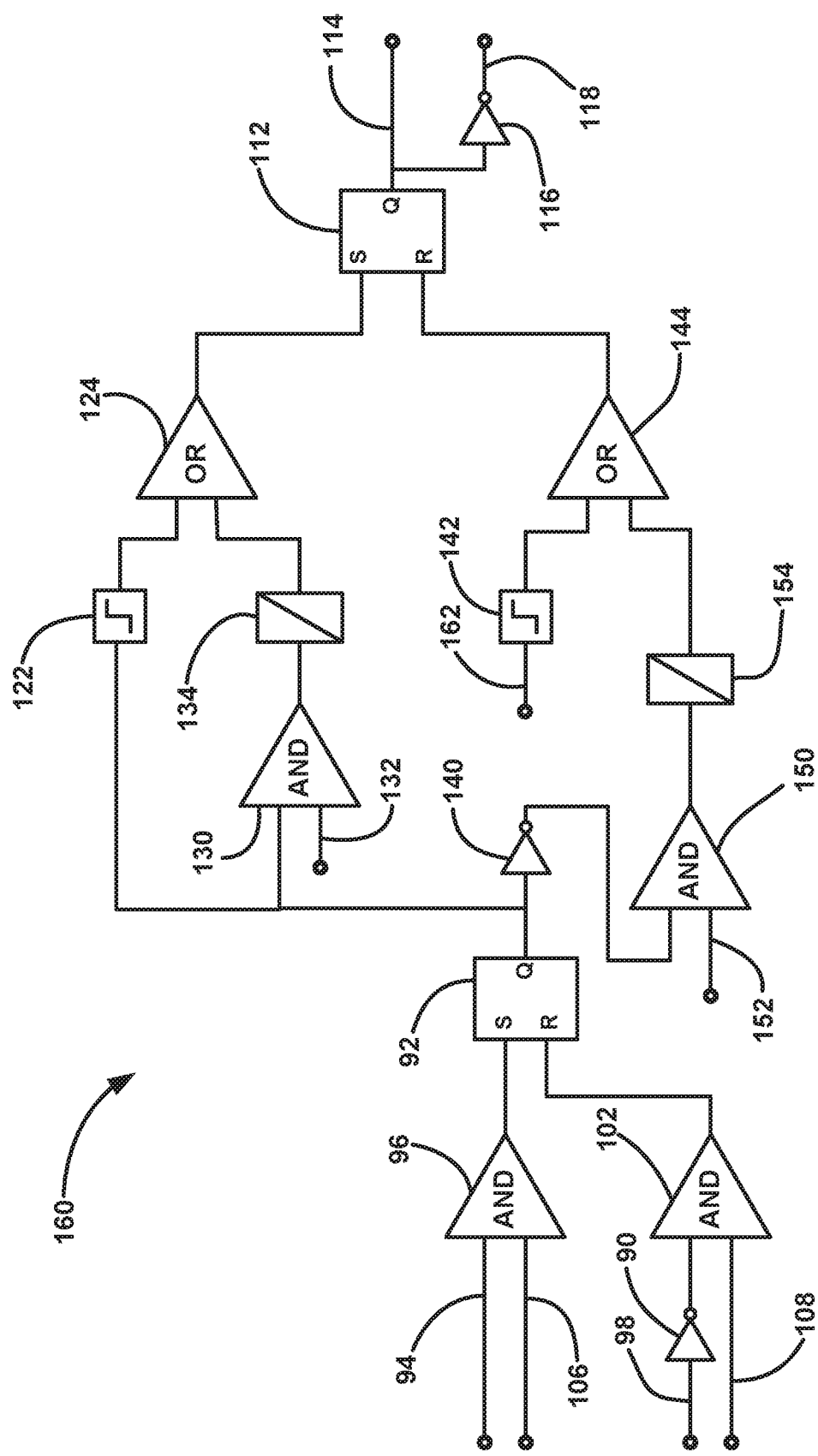
FIG. 4 is a logic diagram showing a process for correcting the settings group of a power source circuit breaker relay.

A similar control logic is employed in the relay 42 that changes its settings group from the grid-connected settings group to the islanded settings group before the relay 44 when the micro-grid 14 is disconnected from the utility grid 12 and changes its settings group from the islanded settings group to the grid-connected settings group after the relay 44 when the micro-grid 14 is connected to the utility grid 12, as discussed above. This control logic is shown by logic diagram 160 in FIG. 4, where like elements to the logic diagram 90 are identified by the same reference number. In the diagram 160, a command from the controller 50 to change the settings group of the relay 42 to the islanded settings group is provided on line 162, which would occur, for example, in the scenario discussed above when the micro-grid 14 is transitioning from being grid-connected to islanded before the switch 16 is opened. Also, the output of the latch 92 is sent to one input of the AND gate 124 to change the settings group to the grid-connected settings group, which would occur, for example, in the scenario discussed above when the micro-grid 14 is transitioning from islanded to grid-connected where the relay 42 automatically detects that the switch 16 has been closed from the relay 40.

The foregoing discussion discloses and describes merely exemplary embodiments of the present disclosure. One skilled in the art will readily recognize from such discussion and from the accompanying drawings and claims that various changes, modifications and variations can be made therein without departing from the spirit and scope of the disclosure as defined in the following claims.

What is claimed is:

1. A method for correcting protection settings groups in a relay that controls a circuit breaker provided in a micro-grid between a grid-connected settings group suitable for higher fault currents and a more stable frequency and voltage when the micro-grid is electrically coupled to a utility grid and an islanded settings group suitable for lower fault currents and a less stable frequency and voltage when the micro-grid is disconnected from the utility grid, said method comprising:
    determining whether the micro-grid is connected to the utility grid;
    determining whether the relay is in the grid-connected settings group or the islanded settings group; and
    changing the settings group of the relay to the grid-connected settings group if a time that the micro-grid is connected to the utility grid and the relay is in the islanded settings group exceeds a predetermined time and changing the settings group of the relay to the islanded settings group if the time that the micro-grid is not connected to the utility grid and the relay is in the grid-connected settings group exceeds the predetermined time.

2. The method according to claim 1 wherein determining whether the micro-grid is connected to the utility grid includes determining whether a disconnect switch that connects and disconnects the micro-grid to and from the utility grid is open or closed.

3. The method according to claim 2 wherein the relay is a relay that controls a power source circuit breaker that connects and disconnects a power source to and from the micro-grid.

4. The method according to claim 3 wherein the method operates during a time when the micro-grid is being disconnected from the utility grid where a disconnect sequence causes the relay to change its settings group from the grid-connected settings group to the islanded settings group before the disconnect switch is opened.

5. The method according to claim 4 wherein changing the settings group of the relay includes changing the settings group of the relay back to the grid-connected settings group if the settings group is changed to the islanded settings group but the disconnect switch does not open within the predetermined time.

6. The method according to claim 3 wherein the method operates during a time when the micro-grid is being connected to the utility grid where a connect sequence causes the relay to change its settings group from the islanded settings group to the grid-connected settings group after the disconnect switch is closed.

7. The method according to claim 6 wherein changing the settings group of the relay includes changing the settings group of the relay back to the islanded settings group if the settings group is changed to the grid-connected settings group but the disconnect switch does not close within the predetermined time.

8. The method according to claim 2 wherein the relay is a relay that controls a load circuit breaker that connects and disconnects a load to and from the micro-grid.

9. The method according to claim 8 wherein the method operates during a time when the micro-grid is being connected to the utility grid where a connect sequence causes the relay to change its settings group from the islanded settings group to the grid-connected settings group before the disconnect switch is closed.

10. The method according to claim 9 wherein changing the settings group of the relay includes changing the settings group of the relay back to the islanded settings group if the settings group is changed to the grid-connected settings group but the disconnect switch does not close within the predetermined time.

11. The method according to claim 8 wherein the method operates during a time when the micro-grid is being disconnected from the utility grid where a disconnect sequence causes the relay to change its settings group from the grid-connected settings group to the islanded settings group after the disconnect switch is closed.

12. The method according to claim 11 wherein changing the settings group of the relay includes changing the settings group of the relay back to the grid-connected settings group if the settings group is changed to the grid-connected settings group but the disconnect switch does not open within the predetermined time.

13. The method according to claim 1 wherein determining whether the micro-grid is connected to the utility grid includes determining whether communications to the relay is good.

14. The method according to claim 1 wherein the predetermined time is about five minutes.

15. A method for correcting protection settings groups in a relay that controls a power source circuit breaker that connects and disconnects a power source to and from a micro-grid between a grid-connected settings group suitable for higher fault currents and a more stable frequency and voltage when the micro-grid is electrically coupled to a utility grid and an islanded settings group suitable for lower fault currents and a less stable frequency and voltage when the micro-grid is disconnected from the utility grid, said method comprising:
    determining whether the micro-grid is connected to the utility grid by determining whether a disconnect switch that connects and disconnects the micro-grid to and from the utility grid is open or closed and communications signals to the relay are good;
    determining whether the relay is in the grid-connected settings group or the islanded settings group; and
    changing the settings group of the relay to the grid-connected settings group if a time that the micro-grid is connected to the utility grid and the relay is in the islanded settings group exceeds a predetermined time or changing the settings group of the relay to the islanded settings group if the time that the micro-grid is not connected to the utility grid and the relay is in the grid-connected settings group exceeds the predetermined time.

16. The method according to claim 15 wherein the method operates during a time when the micro-grid is being disconnected from the utility grid where a disconnect sequence causes the relay to change its settings group from the grid-connected settings group to the islanded settings group before the disconnect switch is opened, and wherein changing the settings group of the relay includes changing the settings group of the relay back to the grid-connected settings group if the settings group is changed to the islanded settings group but the disconnect switch does not open within the predetermined time.

17. The method according to claim 15 wherein the method operates during a time when the micro-grid is being connected to the utility grid where a connect sequence causes the relay to change its settings group from the islanded settings group to the grid-connected settings group after the disconnect switch is closed, and wherein changing the settings group of the relay includes changing the settings group of the relay back to the islanded settings group if the settings group is changed to the grid-connected settings group but the disconnect switch does not close within the predetermined time.

18. A method for correcting fault current detections settings in a relay that controls a load circuit breaker that connects and disconnects a load to and from a micro-grid between a grid-connected settings group suitable for higher fault currents and a more stable frequency and voltage when the micro-grid is electrically coupled to a utility grid and an islanded settings group suitable for lower fault currents and a less stable frequency and voltage when the micro-grid is disconnected from the utility grid, said method comprising:

determining whether the micro-grid is connected to the utility grid by determining whether a disconnect switch that connects and disconnects the micro-grid to and from the utility grid is open or closed and communications signals to the relay are good;

determining whether the relay is in the grid-connected settings group or the islanded settings group; and changing the settings group of the relay to the grid-connected settings group if a time that the micro-grid is connected to the utility grid and the relay is in the islanded settings group exceeds a predetermined time or changing the settings group of the relay to the islanded settings group if the time that the micro-grid is not connected to the utility grid and the relay is in the grid-connected settings group exceeds the predetermined time.

19. The method according to claim 18 wherein the method operates during a time when the micro-grid is being connected to the utility grid where a connect sequence causes the relay to change its settings group from the islanded settings group to the grid-connected settings group before the disconnect switch is closed, and wherein changing the settings group of the relay includes changing the settings group of the relay back to the islanded settings group if the settings group is changed to the grid-connected settings group but the disconnect switch does not close within the predetermined time.

20. The method according to claim 18 wherein the method operates during a time when the micro-grid is being disconnected from the utility grid where a disconnect sequence causes the relay to change its settings group from the grid-connected settings group to the islanded settings group after the disconnect switch is closed, and wherein changing the settings group of the relay includes changing the settings group of the relay back to the grid-connected settings group if the settings group is changed to the grid-connected settings group but the disconnect switch does not open within the predetermined time.

* * * * *